(12) United States Patent
Yanase et al.

(10) Patent No.: US 10,584,658 B2
(45) Date of Patent: Mar. 10, 2020

(54) CYLINDER HEAD

(71) Applicant: TOYOTA JIDOSHA KABUSHIKI KAISHA, Toyota-shi, Aichi-ken (JP)

(72) Inventors: Yoshinori Yanase, Toyota (JP); Hiroyuki Asahina, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 29 days.

(21) Appl. No.: 15/894,989

(22) Filed: Feb. 13, 2018

(65) Prior Publication Data
US 2018/0230936 A1 Aug. 16, 2018

(30) Foreign Application Priority Data
Feb. 16, 2017 (JP) ................. 2017-027119

(51) Int. Cl.
*F02F 1/38* (2006.01)
*F01P 7/14* (2006.01)
*F01P 3/02* (2006.01)
*F02F 1/40* (2006.01)
*F02F 1/24* (2006.01)

(52) U.S. Cl.
CPC ............. *F02F 1/38* (2013.01); *F01P 3/02* (2013.01); *F01P 7/14* (2013.01); *F02F 1/242* (2013.01); *F02F 1/40* (2013.01); *F01P 2003/024* (2013.01)

(58) Field of Classification Search
CPC ...... F02F 1/38; F02F 1/242; F02F 1/40; F01P 3/02; F01P 7/14; F01P 2003/024; F01P 3/16
See application file for complete search history.

(56) References Cited

U.S. PATENT DOCUMENTS

| 4,660,527 A | * | 4/1987 | Tanaka | F01L 1/0532 |
| | | | | 123/193.5 |
| 5,076,217 A | * | 12/1991 | Clough | F01P 3/02 |
| | | | | 123/41.74 |
| 6,681,727 B2 | * | 1/2004 | Krenn | F02F 1/40 |
| | | | | 123/193.5 |

(Continued)

FOREIGN PATENT DOCUMENTS

| AT | 506000 A2 * | 5/2009 | ............... F02F 1/14 |
| DE | 102014118060 A1 | 6/2015 | |

(Continued)

*Primary Examiner* — Hung Q Nguyen
(74) *Attorney, Agent, or Firm* — Sughrue Mion, PLLC

(57) ABSTRACT

A cylinder head includes a water jacket. The water jacket includes multiple coolant spaces between combustion chambers adjacent. The multiple coolant spaces include a high-pressure space having relatively high internal pressures and a low-pressure space having relatively low internal pressures. The high-pressure space and the low-pressure space are alternately arranged with each other. The water jacket includes a first lateral passage passing through the low-pressure space and extending in the lateral direction of the cylinder head, and a communication passage passing between an intake valve hole and an exhaust valve hole, and allowing the high-pressure space and the low-pressure space to communicate with each other. A coolant outlet is connected to the first lateral passage. The coolant inlet is connected to the communication passage or the high-pressure space.

9 Claims, 5 Drawing Sheets

(56) References Cited

U.S. PATENT DOCUMENTS

| | | | | |
|---|---|---|---|---|
| 8,082,894 B2 * | 12/2011 | Poschl | .................... | F02F 1/40 |
| | | | | 123/193.5 |
| 8,397,682 B2 * | 3/2013 | Hamada | ................... | F02F 1/36 |
| | | | | 123/41.82 R |
| 8,904,975 B2 | 12/2014 | Ikeda et al. | | |
| 2002/0170510 A1 * | 11/2002 | Iizuka | ..................... | F01P 7/16 |
| | | | | 123/41.84 |
| 2005/0145205 A1 * | 7/2005 | Haubner | ................. | F01P 3/02 |
| | | | | 123/41.31 |
| 2011/0277708 A1 * | 11/2011 | Geiser | ..................... | F02F 1/40 |
| | | | | 123/41.82 R |
| 2016/0258381 A1 * | 9/2016 | Tempesta | ................. | F02F 1/40 |
| 2017/0044967 A1 | 2/2017 | Maki et al. | | |

FOREIGN PATENT DOCUMENTS

| | | |
|---|---|---|
| JP | 2008-095616 A | 4/2008 |
| JP | 2014-084738 A | 5/2014 |
| MX | 2016010516 A | 2/2017 |

* cited by examiner

CYLINDER HEAD

INCORPORATION BY REFERENCE

The disclosure of Japanese Patent Application No. 2017-027119 filed on Feb. 16, 2017 including the specification, drawings and abstract is incorporated herein by reference in its entirety.

BACKGROUND

1. Technical Field

The present disclosure relates to a cylinder head for an internal combustion engine, and more specifically, relates to a cylinder head including a water jacket through which a coolant flows.

2. Description of Related Art

A cylinder head for an internal combustion engine is formed with a water jacket through which a coolant flows. Structures of water jackets of related art are roughly classified into a longitudinal flow structure designed to bring a coolant to flow in the longitudinal direction of a cylinder head and a lateral flow structure designed to bring a coolant to flow in the lateral direction of a cylinder head. Japanese Patent Application Publication No. 2014-084738 discloses an example of a cylinder head to which a longitudinal flow structure of a water jacket is applied. The cylinder head disclosed in this Patent Literature is provided with multiple water jackets in the water jacket. Of these water jackets, a combustion-chamber water jacket is a water jacket configured to cool top parts of the combustion chambers, and formed such that a coolant flows along the top parts of the four combustion chambers aligned in the longitudinal direction.

SUMMARY

If the longitudinal flow structure of the water jacket and the lateral flow structure of the water jacket are compared with each other, pressure loss when the coolant flows through the water jacket becomes greater in the longitudinal flow structure. Hence, the longitudinal flow structure might be more disadvantageous in fuel efficiency than the lateral flow structure is. On the other hand, in the lateral flow structure in which the coolant flows between the combustion chambers in the lateral direction, when focusing on a single combustion chamber, coolant flows at the front side of the combustion chamber in the longitudinal direction are in contrast to coolant flows at the rear side thereof. Hence, a difference in pressure is hard to generate between the front side and the rear side of the combustion chamber in the longitudinal direction, and it is difficult to form coolant flows between exhaust valve holes and intake valve holes of the combustion chambers. In particular, in the case of a cylinder head provided with an injector at a top part of each combustion chamber, a periphery of the injector hole is desired to be cooled, but it is difficult to form a coolant flow between the injector hole and an ignition plug hole.

The present disclosure provides a cylinder head capable of forming a coolant flow between an exhaust valve hole and an intake valve hole of each combustion chamber so as to efficiently cool a top part of the combustion chamber while pressure loss is reduced to a low level.

A cylinder head according to the present disclosure is a cylinder head for a multiple-cylinder engine, and includes multiple combustion chambers aligned in the longitudinal direction of the cylinder head. In the present application, the combustion chambers of the cylinder head denote parts located on the cylinder head side configuring closed spaces where a fuel air mixture is combusted. Hence, in the present application, each combustion chamber is not always necessary to be in a shape recessed from a cylinder-block mating surface of the cylinder head, but might be in a plane with the cylinder-block mating surface in some cases. In general, a cylinder head for a spark-ignition type engine is provided with recessed-shaped combustion chambers relative to a cylinder-block mating surface, and a cylinder head for a compression self-igniting engine is provided with combustion chambers, each having an identical surface to a cylinder-block mating surface thereof.

In the present application, the longitudinal direction of the cylinder head is defined as a direction of a cylinder line when the cylinder head is assembled to the cylinder block so as to configure an engine, that is, as an axial direction of a crankshaft. In addition, in the present application, a direction orthogonal to the longitudinal direction, and parallel to the cylinder-block mating surface of the cylinder head is referred to as a lateral direction (i.e. a width direction) of the cylinder head, and a direction orthogonal to the longitudinal direction and vertical to the cylinder-block mating surface of the cylinder head is referred to as a height direction of the cylinder head.

The cylinder head according to the present disclosure includes intake valve holes extending through the cylinder head in the vertical direction and opening to the combustion chambers, and exhaust valve holes extending through the cylinder head in the vertical direction and opening to the combustion chambers. The number of the intake valve holes per combustion chamber is determined depending on the number of the intake valves per cylinder. The number of the exhaust valve holes per combustion chamber is determined depending on the number of the exhaust valves per cylinder.

The cylinder head according to the present disclosure includes a water jacket formed in the cylinder head. The water jacket includes multiple coolant spaces located between the adjacent combustion chambers, and located outward of the combustion chambers provided at both ends in the longitudinal direction. These coolant spaces are not closed spaces, but spaces where the coolant flows in and out. Specifically, these coolant spaces include high-pressure spaces having relatively high internal pressures when the coolant flows, and low-pressure spaces having relatively low internal pressures when the coolant flows. The high-pressure spaces and the low-pressure spaces are alternately arranged with the combustion chambers interposed therebetween.

The water jacket includes first lateral passages passing through the low-pressure spaces in the lateral direction of the cylinder head. Passing of the first lateral passages through the low-pressure spaces includes that the low-pressure spaces are present in the middle of the first lateral passages, and that the first lateral passages extend from the low-pressure spaces as starting points. Extending of the first lateral passages in the lateral direction is not limited to a meaning that the first lateral passages are straight in the lateral direction. Each of the first lateral passages may not always have to be in a uniform shape in the longitudinal direction or in the height direction of the cylinder head as far as the first lateral passage expands in the lateral direction as a whole. A coolant outlet is connected to the first lateral passages. The coolant outlet is a hole for discharging the coolant inside the water jacket to the outside of the cylinder head. The position and the number of the coolant outlet are not limited to specific ones. The meaning of connecting includes that the first lateral passages are directly connected to the coolant outlet, and that the first lateral passages are connected to the coolant outlet via other passages.

In addition, the water jacket includes communication passages passing between the intake valve holes and the exhaust valve holes, and allowing the high-pressure spaces and the low-pressure spaces to communicate with each other. The communication passages may be any passages that spatially connect the high-pressure spaces to the low-pressure spaces with the combustion chambers interposed therebetween, and the shapes thereof are not limited to specific shapes. Coolant inlets are connected to the communication passages or the high-pressure spaces. The coolant inlet is a hole for feeding the coolant into the water jacket from the outside of the cylinder head. The positions and the number of the coolant inlets provided to the cylinder head are not limited to specific ones. The meaning of connecting includes that the communication passages or the high-pressure spaces are directly connected to the coolant inlet, and that the communication passages or the high-pressure spaces are connected to the coolant inlet via other passages.

Specifically, a cylinder head for an internal combustion engine according to an aspect of the present disclosure, includes multiple combustion chambers aligned in a longitudinal direction of the cylinder head, each intake valve hole extending through the cylinder head in the vertical direction and opening to the combustion chamber, each exhaust valve hole extending through the cylinder head in the vertical direction and opening to the combustion chamber, and a water jacket formed in the cylinder head. The water jacket includes multiple coolant spaces located between the combustion chambers that are adjacent, and located outward of the combustion chambers located at both ends in the longitudinal direction. The multiple coolant spaces include a high-pressure space having relatively high internal pressures when the coolant flows, and a low-pressure space having relatively low internal pressures when the coolant flows. The high-pressure space and the low-pressure space are alternately arranged with each other with the combustion chamber interposed therebetween. The water jacket includes a first lateral passage passing through the low-pressure space and extending in a lateral direction of the cylinder head, and a communication passage passing between the intake valve hole and the exhaust valve hole and allowing the high-pressure space and the low-pressure space to communicate with each other. A coolant outlet is connected to the first lateral passage. A coolant inlet is connected to the communication passage or to the high-pressure space.

According to the above configuration of the cylinder head, when the coolant flows through the inside of the water jacket, the coolant flows are formed in the communication passages allowing the high-pressure spaces and the low-pressure spaces to communicate with each other due to differences in pressure between the high-pressure spaces and the low-pressure spaces located with the combustion chambers interposed therebetween. Each of the communication passages passes between the intake valve hole and the exhaust valve hole, and the coolant flows through this passage, to thereby efficiently cool the top parts of the combustion chambers. Further, the coolant does not flow between the combustion chambers in the longitudinal direction, but flows in the lateral direction between the low-pressure spaces located alternately with the high-pressure spaces; therefore, it is possible to reduce the pressure loss through the entire water jacket to a lower level, compared with the so-called longitudinal flow structure.

In the above aspect, the cylinder head may further include each injector hole extending through the cylinder head in the vertical direction and opening to an intake side of the combustion chamber, and ignition plug hole extending through the cylinder head in the vertical direction and opening to an exhaust side of the combustion chamber, and the communication passage may pass between the injector hole and the ignition plug hole. According to this, the coolant flows are formed between the injector holes and the ignition plug holes, to thereby effectively cool the injectors. In the above configuration, the communication passage may pass between the injector hole and the ignition plug hole, or between the ignition plug hole and the exhaust valve hole.

The water jacket may include a longitudinal passage located outward of the combustion chambers and extending in the longitudinal direction. Extending of the longitudinal passage in the longitudinal direction is not limited to a meaning that the longitudinal passage is straight in the longitudinal direction. The longitudinal passage may not always have to be in a uniform shape in the lateral direction or in the height direction of the cylinder head as far as the longitudinal passage expands in the longitudinal direction as a whole. That is, in the above aspect, the water jacket may include a longitudinal passage located outward of the combustion chambers and extending in the longitudinal direction, the coolant outlet may be provided to the longitudinal passage; and the first lateral passage may be connected to the coolant outlet via the longitudinal passage. In the above configuration, there may be provided no passage connecting the high-pressure space to the longitudinal passage in the lateral direction. By not providing such passages, the coolant does not flow from the high-pressure spaces to the coolant outlet in the lateral direction, and thus it is possible to maintain the pressure in the high-pressure spaces to be high.

In the above aspect, the water jacket may include second lateral passage that pass through the high-pressure space, extend in the lateral direction, is connected to the coolant outlet, and have a greater pressure loss than that of the first lateral passage when the coolant flows. Extending of the second lateral passages in the lateral direction is not limited to a meaning that the second lateral passages are straight in the lateral direction. The second lateral passages may not always have to be in a uniform shape in the longitudinal direction or in the height direction of the cylinder head as far as the lateral passages expand in the lateral direction as a whole. The second lateral passages that connect the high-pressure spaces to the coolant outlet are provided, to thereby exchange the coolant in the high-pressure spaces. Note that the second lateral passages are required to have a greater pressure loss when the coolant flows than that of the first lateral passages. This is for maintaining the pressure in the high-pressure spaces to be higher than the pressure in the low-pressure spaces.

In the above configuration, the water jacket may include a longitudinal passage that is located outward of the combustion chambers, and extends in the longitudinal direction, the coolant outlet may be provided to the longitudinal passage, and the first lateral passage and the second lateral passage may be connected to the coolant outlet via the longitudinal passage. In the above configuration, the second lateral passage may pass through only some high-pressure spaces of the multiple high-pressure spaces, and there may be provided no passage connecting the rest of the multiple high-pressure spaces to the longitudinal passage in the lateral direction.

The present disclosure provides a cylinder head capable of forming a coolant flow between an exhaust valve hole and an intake valve hole of each of combustion chambers so as to efficiently cool top parts of the combustion chambers while pressure loss is reduced to a low level.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

With reference to drawings, embodiments of the present disclosure will be described with reference to drawings. Note that the following embodiments illustrate the apparatus and the methods for embodying the technical ideas of the present disclosure, and do not intend to limit structures and arrangements of components, an order of processing, and the like to the following description, except for the case where it is explicitly described. The present disclosure is not limited to the embodiments shown below, but can be variously changed to be carried out within such a range as not to deviate from the scope of the present disclosure.

Embodiment 1

Embodiment 1 of the present disclosure will be described with reference to the drawings. It is assumed in Embodiment 1 that an internal combustion engine is a spark-ignition water-cooling type in-line four cylinder engine including an injector at a top part of each of combustion chambers. This assumption is also applied to Embodiments 2 to 4 described later. However, when the present disclosure is applied to an internal combustion engine, there is no limitation to the number of cylinders and arrangements of cylinders of the internal combustion engine, or an ignition system of the internal combustion engine, except that the combustion engine is a multiple-cylinder engine of water-cooling type having multiple cylinders.

Configuration of Cylinder Head of Embodiment 1

Figure 1:
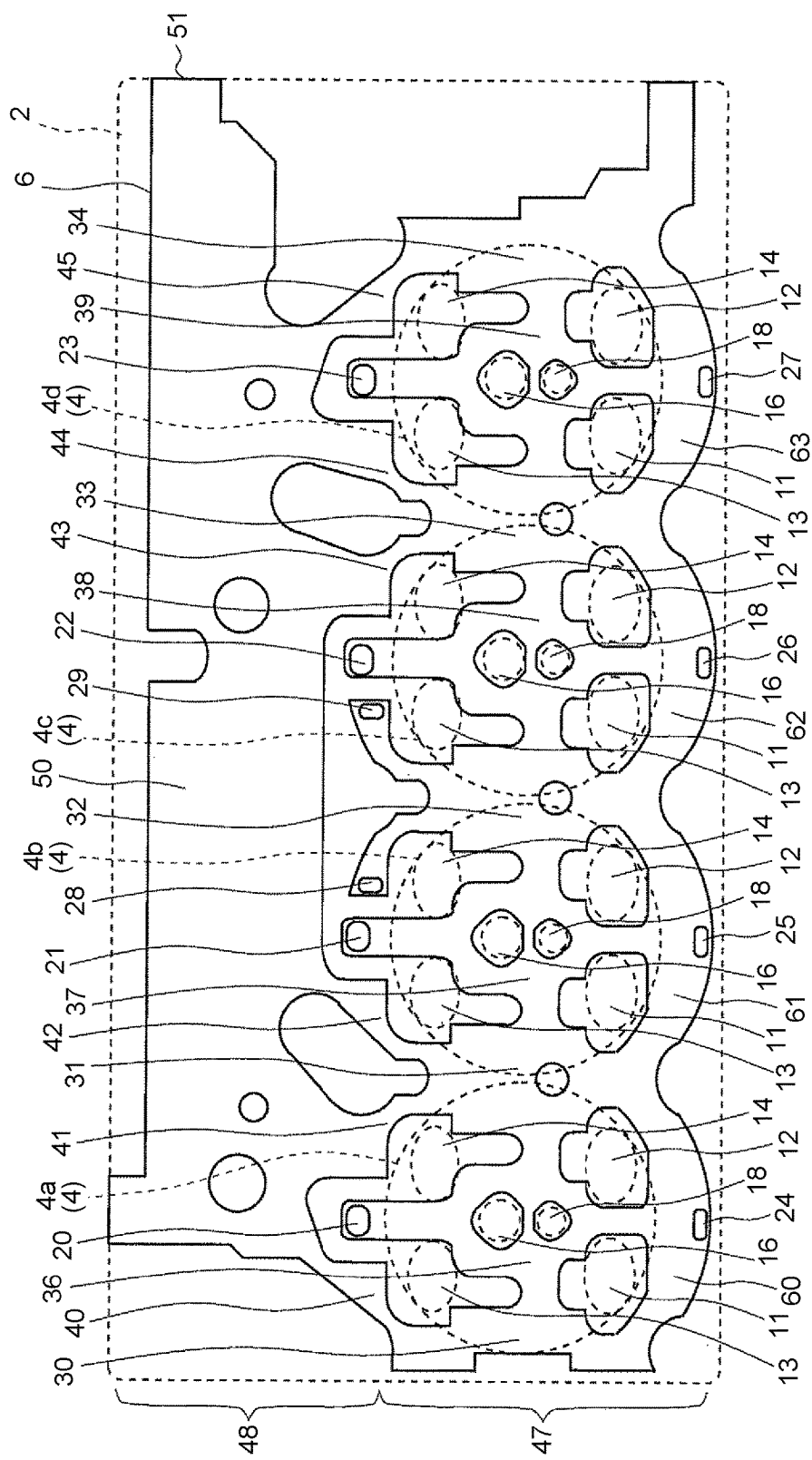
FIG. 1 is a plan view illustrating a water jacket of a cylinder head of Embodiment 1 of the present disclosure in a see-through manner.

FIG. 1 is a plan view illustrating a water jacket of a cylinder head of Embodiment 1 in a see-through manner. In the cylinder head 2, combustion chambers 4a, 4b, 4c, 4d for four cylinders are aligned in series in the longitudinal direction with equal intervals. In the present specification, the four combustion chambers refer to "combustion chambers 4" unless otherwise distinguished. In the present specification, as aforementioned, an axial direction of a crankshaft is defined as a longitudinal direction of the cylinder head 2, and a direction orthogonal to the longitudinal direction and parallel to a cylinder-block mating surface of the cylinder head 2 is defined as a lateral direction (i.e. a width direction) of the cylinder head 2.

In the cylinder head 2, each combustion chamber 4 is provided with two intake valve holes 11, 12 extending through the cylinder head 2 in the vertical direction and opening to the combustion chamber 4, and two exhaust valve holes 13, 14 extending through the cylinder head 2 in the vertical direction and opening to the combustion chamber 4. Valve guides supporting not-illustrated stems of the intake valves are press-fitted respectively into the intake valve holes 11, 12. Valve guides supporting not-illustrated stems of the exhaust valves are press-fitted respectively into the exhaust valve holes 13, 14. In the present specification, a side where the intake valve holes 11, 12 are located as viewed from the crankshaft in the lateral direction of the cylinder head 2 is defined as an intake side, and a side where the exhaust valve holes 13, 14 are located as viewed from the crankshaft is defined as an exhaust side.

In the cylinder head 2, each combustion chamber 4 is provided with an injector hole 18 extending through the cylinder head 2 in the vertical direction and opening to the intake side at the center of the combustion chamber 4, and an ignition plug hole 16 extending through the cylinder head 2 in the vertical direction and opening to the exhaust side at the center of the combustion chamber 4. A not-illustrated injector for fuel injection is attached to each injector hole 18. A not-illustrated ignition plug is attached to each ignition plug hole 16.

The cylinder head 2 is provided with a water jacket 6 through which a coolant flows. The water jacket 6 is formed in an inside of the cylinder head 2 using a core, during casting of the cylinder head 2. The shape of this core is identical to the shape of the water jacket 6 illustrated in FIG. 1. Some of sand escape holes, which are formed when the water jacket 6 is formed using the core, are used as coolant inlets for feeding a coolant into the water jacket 6, and also as a coolant outlet for discharging the coolant from the inside of the water jacket 6.

The water jacket 6 is composed of a combustion-chamber-side water jacket 47 that cools the top parts of the combustion chambers 4 and peripheries thereof, and an exhaust-side water jacket 48 that cools peripheries of not-illustrated exhaust ports. Cooling of the not-illustrated intake ports is carried out by the combustion-chamber-side water jacket 47.

The configuration of the combustion-chamber-side water jacket 47 will be described. The combustion-chamber-side water jacket 47 is provided with coolant spaces 31, 32, 33 respectively between the combustion chambers 4a, 4b, between the combustion chambers 4b, 4c, and between the combustion chambers 4c, 4d. The combustion-chamber-side water jacket 47 includes a coolant space 30 located between the combustion chamber 4a located at the front end in the longitudinal direction and a front end portion of the cylinder head 2, and a coolant space 34 between the combustion chamber 4d located at the rear end in the longitudinal direction and a rear end portion of the cylinder head 2.

The coolant spaces 30, 31 located with the combustion chamber 4a interposed therebetween are connected by a communication passage 36. Similarly, the coolant spaces 31, 32 located with the combustion chamber 4b interposed therebetween are connected by a communication passage 37. The coolant spaces 32, 33 located with the combustion chamber 4c interposed therebetween are connected by a communication passage 38. The coolant spaces 33, 34 located with the combustion chamber 4d interposed therebetween are connected by a communication passage 39. Each of the communication passages 36, 37, 38, 39 passes between the intake valve holes 11, 12 and the exhaust valve holes 13, 14. Specifically, each of the communication passages 36, 37, 38, 39 includes a passage passing between the injector hole 18 and the ignition plug hole 16, a passage passing between the intake valve holes 11, 12 and the injector hole 18, and a passage passing between the exhaust valve holes 13, 14 and the ignition plug hole 16.

Peripheries of the not-illustrated intake ports communicating with the respective combustion chambers 4a, 4b, 4c, 4d are provided with intake-side passages 60, 61, 62, 63. The intake-side passage 60 passes outward of the intake valve holes 11, 12 of the combustion chamber 4a so as to allow the coolant spaces 30 and 31 to communicate with each other. Similarly, the intake-side passage 61 allows the coolant spaces 31 and 32 to communicate with each other from the outside of the combustion chamber 4b, and the intake-side passage 62 allows the coolant spaces 32 and 33 to communicate with each other from the outside of the combustion chamber 4c, and the intake-side passage 63 allows the coolant spaces 33 and 34 to communicate with each other from the outside of the combustion chamber 4d. The intake-side passages 60, 61, 62, 63 and the communication passages 36, 37, 38, 39 are connected to each other by passages formed between the respective intake valve holes 11 and 12.

The combustion-chamber-side water jacket 47 is provided with multiple coolant inlets 20 to 29. The coolant inlets 20 to 29 are classified into large flow inlets 20, 21, 22, 23, medium flow inlets 24, 25, 26, 27 and small flow inlets 28, 29 according to the differences in flow rate. The large flow inlets 20, 21, 22, 23 are provided on the exhaust side outward of the combustion chambers 4a, 4b, 4c, 4d, and pass between the respective exhaust valve holes 13 and 14, and are connected to the respective communication passages 36, 37, 38, 39. The medium flow inlets 24, 25, 26, 27 are provided respectively to the intake-side passages 60, 61, 62, 63. The small flow inlet 28 is provided on the exhaust side outward of the combustion chamber 4b, and the small flow inlet 29 is provided on the exhaust side outward of the combustion chamber 4c, and these small flow inlets are connected to the coolant space 32, respectively. These coolant inlets 20 to 29 open to the cylinder-block mating surface of the cylinder head 2 so that the coolant having passed through the inside of the cylinder block flows from the coolant inlets 20 to 29 into the cylinder head 2.

Next, the configuration of the exhaust-side water jacket 48 will be described. The exhaust-side water jacket 48 includes a longitudinal passage 50 extending in the longitudinal direction of the cylinder head 2. The longitudinal passage 50 covers at least parts of the not-illustrated exhaust ports.

The exhaust-side water jacket 48 includes lateral passages 40, 41, 42, 43, 44, 45 extending in the lateral direction of the cylinder head 2, and allowing the longitudinal passage 50 to communicate with the combustion-chamber-side water jacket 47. The lateral passage 40 passes through the coolant space 30. The lateral passage 41, 42 pass through the coolant space 31. The lateral passages 43, 44 pass through the coolant space 33. The lateral passage 45 passes through the coolant space 34. However, there is provided no passage that connects the longitudinal passage 50 to the coolant space 32 located at the center in the lateral direction. The lateral passages 40, 45 located at the both ends in the longitudinal direction are so formed as to have a greater pressure loss when the coolant flows than that in the lateral passages 41, 42, 43, 44 provided more inward than the lateral passages 40, 45.

The exhaust-side water jacket 48 is provided with a coolant outlet 51. The coolant outlet 51 is located at a rear end portion of the longitudinal passage 50, and opens to a side surface at a rear end of the cylinder head 2.

Coolant Flows in Water Jacket of Embodiment 1

Figure 2:
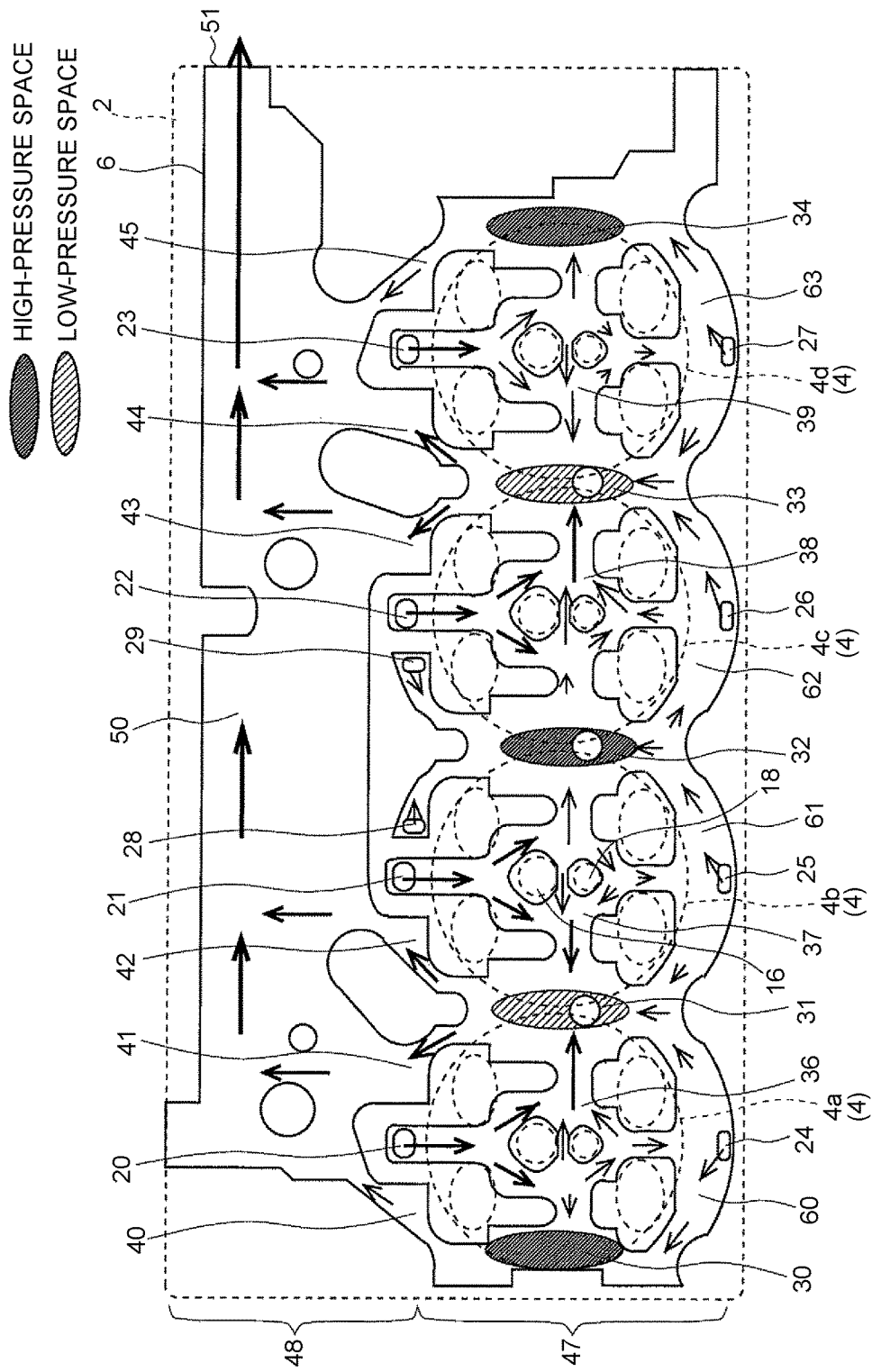
FIG. 2 is a plan view showing coolant flows in an inside of the water jacket of the cylinder head of Embodiment 1 of the present disclosure.

Next, coolant flows in the inside of the water jacket 6 of the above-configured cylinder head 2 will be described. FIG. 2 is a plan view showing the coolant flows in inside of the water jacket 6 when the coolant is fed from the coolant inlets 20 to 29, flows through the inside of the water jacket 6, and is then discharged from the coolant outlet 51. In FIG. 2, the coolant flows are indicated by arrow lines. A length and a thickness of each arrow line indicate a degree of the flow rate. As the arrow line of interest is longer, and as the arrow line of interest is thicker, the flow rate at the starting point of this arrow line is greater.

In FIG. 2, of the coolant spaces 30, 31, 32, 33, 34 adjacent to the respective combustion chambers 4, each densely hatched area indicates a high-pressure space having a relatively high internal pressure when the coolant flows. Of the coolant spaces 30, 31, 32, 34 adjacent to the respective combustion chambers 4, each less densely hatched area indicates a low-pressure space having a relatively low internal pressure when the coolant flows. However, also in FIG. 2, the regions indicated by oblique lines merely represent images of presence of the high-pressure spaces and the low-pressure spaces, and it is not intended to show accurate regions of the high-pressure spaces or the low-pressure spaces.

Of the coolant inlets 20 to 29, the large flow inlets 20, 21, 22, 23 whose flow rates are greater have greater influences on the internal pressures of the coolant spaces 30, 31, 32, 33, 34. The coolant fed from the large flow inlet 20 to the communication passage 36 flows into the coolant spaces 30, 31 with the combustion chamber 4a therebetween. The coolant fed from the large flow inlet 21 to the communication passage 37 flows into the coolant spaces 31, 32 with the combustion chamber 4b therebetween. The coolant fed from the large flow inlet 20 to the communication passage 38 flows into the coolant spaces 32, 33 with the combustion chamber 4c therebetween. The coolant fed from the large flow inlet 23 to the communication passage 39 flows into the coolant spaces 33, 34 with the combustion chamber 4d therebetween. In this manner, the coolant flows into all the coolant spaces 30, 31, 32, 33, 34. Hence, levels of the internal pressures in the coolant spaces 30, 31, 32, 33, 34 rely on easiness of flow-out of the coolant.

The lateral passages 41, 42 communicating with the longitudinal passage 50 pass through the coolant space 31. The lateral passages 43, 44 communicating with the longitudinal passage 50 also pass through the coolant space 33. To the contrary, no passage communicating with the longitudinal passage 50 passes through the coolant space 32 at the center. Hence, in the coolant spaces 31, 33, the coolant flows out through the lateral passages 41, 42, and thus their internal pressures are lower. To the contrary, no coolant directly flows out from the coolant space 32 in the lateral direction, and the coolant flow stagnates, so that the internal pressure in the coolant space 32 becomes relatively high. Accordingly, it can be said that when the coolant spaces 31, 33 are compared with the coolant space 32, the coolant spaces 31, 33 are relatively low-pressure spaces, and the coolant space 32 is a relatively high-pressure space.

The lateral passages 40, 45 communicating with the longitudinal passage 50 pass through the coolant spaces 30, 34 at the both ends. However, these lateral passages 40, 45 have a greater pressure loss when the coolant flows than that of the lateral passages 41, 42, 43, 44 located inward. That is, the lateral passages 41, 42, 43, 44 correspond to first lateral passages as defined in claims, and the lateral passages 40, 45 correspond to second lateral passages as defined in the claims. Hence, compared with the coolant spaces 31, 33, the flow rate of the coolant flowing out from the coolant spaces 30, 34 to the longitudinal passage 50 is smaller, and the coolant flow stagnates, so that the internal pressures of the coolant spaces 30, 34 become relatively high. Accordingly, it can be said that when the coolant spaces 31, 33 are compared with the coolant spaces 30, 34, the coolant spaces 31, 33 are relatively low-pressure spaces, and the coolant spaces 30, 34 are relatively high-pressure spaces.

As aforementioned, when the coolant flows through the inside of the water jacket 6, the coolant space 30 located outward of the combustion chamber 4a at the front end, the coolant space 34 located outward of the combustion chamber 4b at the rear end, and the coolant space 32 located at the center between the combustion chamber 4b and the combustion chamber 4c become high-pressure spaces; and the coolant space 31 located between the combustion chamber 4a and the combustion chamber 4b, and the coolant space 33 located between the combustion chamber 4c and the combustion chamber 4d are low-pressure spaces. Specifically, when the coolant flows through the inside of the water jacket 6, there are formed the high-pressure spaces and the low-pressure spaces that are located alternately with each other with the combustion chambers 4 therebetween.

Pressure differences between the high-pressure spaces and the low-pressure spaces influence on the coolant flows in the insides of the communication passages 36, 37, 38, 39 allowing the high-pressure spaces and the low-pressure spaces to communicate with each other. FIG. 2 illustrates complicated flows of the coolant flowing through the inside of the communication passages 36, 37, 38, 39. Due to presence of pressure differences between the coolant spaces with the combustion chambers 4 interposed therebetween, a force acting from the high-pressure spaces toward the low-pressure spaces is applied to the coolant, so that a coolant flow is formed between each injector hole 18 and each ignition plug hole 16. Accordingly, it is possible to efficiently cool the top parts of the combustion chambers 4 including the injectors. In addition, the coolant does not flow in the longitudinal direction between the combustion chambers 4, but flows in the lateral direction through the low-pressure spaces (coolant spaces 31, 33) located alternately with the high-pressure spaces (coolant spaces 30, 32, 34); therefore, it is possible to reduce the pressure loss through the entire water jacket 6 to a lower level, compared with a so-called longitudinal flow structure.

Embodiment 2

Figure 3:
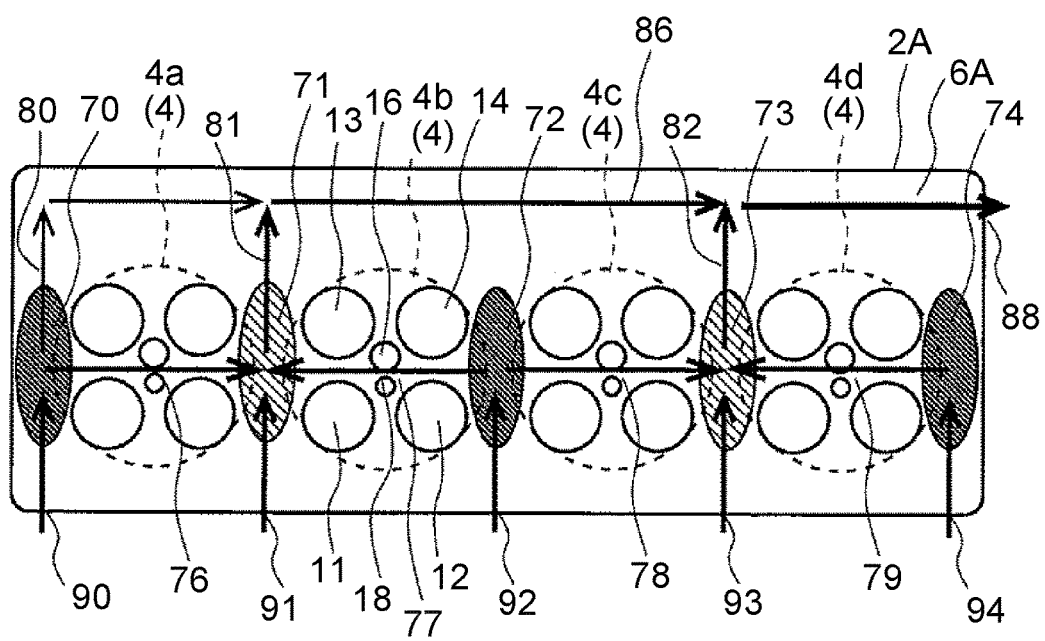
FIG. 3 is a schematic plan view showing a configuration of a water jacket of a cylinder head and coolant flows in the inside of the water jacket of Embodiment 2 of the present disclosure.

Next, Embodiment 2 of the present disclosure will be described with reference to the drawings. FIG. 3 is a schematic plan view showing a configuration of a water jacket of a cylinder head of Embodiment 2 and coolant flows in the inside of the water jacket. A cylinder head 2A of Embodiment 2 has the same basic configuration as that of the cylinder head 2 of Embodiment 1. Hence the description regarding the basic configuration of the cylinder head 2 of the Embodiment 1 is directly cited for describing the basic configuration of the cylinder head 2A of Embodiment 2, and duplicated description thereof will be omitted. In FIG. 3, the same reference numerals are used for components common to those of Embodiment 1.

The cylinder head 2A of Embodiment 2 is formed with a water jacket 6A. The water jacket 6A includes: coolant spaces 71, 72, 73 provided respectively between the combustion chambers 4a and 4b, between the combustion chambers 4b and 4c, and between the combustion chambers 4c and 4d; and coolant spaces 70, 74 provided outward of the combustion chambers 4a and 4d at the both ends in the longitudinal direction. The water jacket 6A also includes communication passages 76, 77, 78, 79, each allowing the coolant spaces located on the both sides of each of the combustion chambers 4 to communicate with each other. Each of the communication passages 76, 77, 78, 79 includes: a passage passing between the intake valve holes 11, 12 and the exhaust valve holes 13, 14, and also between the injector hole 18 and the ignition plug hole 16; a passage passing between the intake valve holes 11, 12 and the injector hole 18; and a passage passing through the exhaust valve holes 13, 14 and the ignition plug hole 16.

Coolant inlets 90, 91, 92, 93, 94 provided on the intake side of the cylinder head 2A are connected respectively to the coolant spaces 70, 71, 72, 73, 74. These coolant inlets 90, 91, 92, 93, 94 correspond to the large flow inlets of Embodiment 1. Coolant inlets corresponding to the medium flow inlets and the small flow inlets are also provided, but these inlets have only small influences on the coolant flows, and thus description thereof will be omitted.

The water jacket 6A includes a longitudinal passage 86 that is provided on the exhaust side outward of the combustion chambers 4 and is connected to a coolant outlet 88. The longitudinal passage 86 cools the not-illustrated exhaust ports. In addition, the water jacket 6A includes a lateral passage 81 passing through the coolant space 71 and connected to the longitudinal passage 86, and a lateral passage 82 passing through the coolant space 73 and connected to the longitudinal passage 86. These lateral passages 81, 82 are examples of the first lateral passages defined in the claims. The water jacket 6A includes a lateral passage 80 passing through a coolant space 70 and connected to the longitudinal passage 86. This lateral passage 80 is a passage having a greater pressure loss, compared with the lateral passages 81, 82, and is an example of the second lateral passage defined in the claims.

By providing the coolant passages and the coolant inlets and outlets in the above manner, high-pressure spaces having relatively high pressures and low-pressure spaces having relatively low pressures are formed when the coolant flows through the inside of the water jacket 6A. Specifically, the coolant spaces 71, 73 through which the lateral passages 81, 82 pass become the low-pressure spaces, and the coolant spaces 72, 74 where no passages connecting these coolant spaces to the longitudinal passage 86 in the lateral direction pass, and the coolant space 70 connected to the longitudinal passage 86 by the lateral passage 80 having a great pressure loss become the high-pressure spaces.

As indicated by arrows in FIG. 3, in the communication passages 76, 77, 78, 79, the coolant flows are formed by pressure differences between the high-pressure spaces and the low-pressure spaces located with the combustion chambers 4 interposed therebetween. The communication passages 76, 77, 78, 79 include passages, each passing between the injector hole 18 and the ignition plug hole 16, and the coolant flows through this passage, to thereby efficiently cool the top parts of the combustion chambers 4 including the injectors. The coolant does not flow in the longitudinal direction between the combustion chambers 4, but flows in the lateral direction through the low-pressure spaces (coolant spaces 71, 73) located alternately with the high-pressure spaces (coolant spaces 70, 72, 74); therefore, it is possible to reduce the pressure loss through the entire water jacket 6A to a lower level, compared with the so-called longitudinal flow structure.

Embodiment 3

Figure 4:
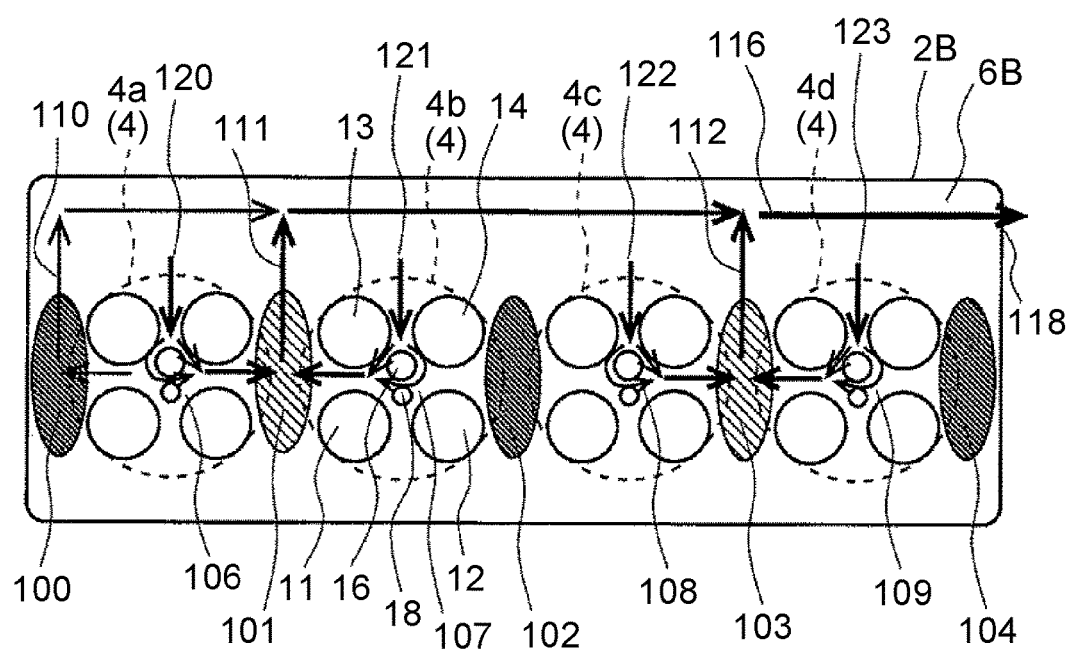
FIG. 4 is a schematic plan view showing a configuration of a water jacket of a cylinder head and coolant flows in the inside of the water jacket of Embodiment 3 of the present disclosure.

Embodiment 3 of the present disclosure will be described with reference to the drawings. FIG. 4 is a schematic plan view showing a structure of a water jacket of a cylinder head of Embodiment 3 and coolant flows flowing through the inside of the water jacket. A cylinder head 2B of Embodiment 3 has the same basic configuration as that of the cylinder head 2 of Embodiment 1. Hence, the description regarding the basic configuration of the cylinder head 2 of the Embodiment 1 is directly cited for describing the basic configuration of the cylinder head 2B of Embodiment 3, and duplicated description thereof will be omitted. In FIG. 4, the same reference numerals are used for components common to those of Embodiment 1.

The cylinder head 2B of Embodiment 3 is formed with a water jacket 6B. The water jacket 6B includes: coolant spaces 101, 102, 103 provided respectively between the combustion chambers 4a and 4b, between the combustion chambers 4b and 4c, and between the combustion chambers 4c and 4d; and coolant spaces 100, 104 provided respectively outward of the combustion chambers 4a and 4d at the both ends in the longitudinal direction. The water jacket 6B also includes communication passages 106, 107, 108, 109, each allowing the coolant spaces located on the both sides of each combustion chamber 4 to communicate with each other. Each of the communication passages 106, 107, 108, 109 includes: a passage passing between the intake valve holes 11, 12 and the exhaust valve holes 13, 14, and also between the injector hole 18 and the ignition plug hole 16; a passage passing between the intake valve holes 11, 12 and the injector hole 18; and a passage passing between the exhaust valve holes 13, 14 and the ignition plug hole 16.

The coolant inlets 120, 121, 122, 123 provided on the exhaust side of the respective combustion chambers 4a, 4b, 4c, 4d at the respective center positions in the lateral direction of the cylinder head 2B are connected respectively to the communication passages 106, 107, 108, 109. These coolant inlets 120, 121, 122, 123 correspond to the large flow inlets of Embodiment 1. Coolant inlets corresponding to the medium flow inlets and the small flow inlets are also provided, but these inlets have only small influences on the coolant flows, and thus description thereof will be omitted.

The water jacket 6B includes a longitudinal passage 116 provided on the exhaust side outward of the combustion chambers 4 and connected to a coolant outlet 118. The longitudinal passage 116 cools not-illustrated exhaust ports. In addition, the water jacket 6B includes a lateral passage 111 passing through the coolant space 101 and connected to the longitudinal passage 116, and a lateral passage 112 passing through the coolant space 103 and connected to the longitudinal passage 116. These lateral passages 111, 112 are examples of the first lateral passages defined in the claims. The water jacket 6B includes a lateral passage 110 passing through a coolant space 100 and connected to the longitudinal passage 116. This lateral passage 110 is a passage having a greater pressure loss, compared with the lateral passages 111, 112, and is an example of the second lateral passage defined in the claims.

By providing the coolant passages and the coolant inlets and outlet in the above manner, high-pressure spaces having relatively high pressures and low-pressure spaces having relatively low pressures are formed when the coolant flows through the inside of the water jacket 6B. Specifically, the coolant spaces 101, 103 through which the lateral passages 111, 112 pass become the low-pressure spaces, and the coolant spaces 102, 104 where no passages connecting these coolant spaces to the longitudinal passage 116 in the lateral direction pass, and the coolant space 100 connected to the longitudinal passage 116 by the lateral passage 110 having a great pressure loss become the high-pressure spaces.

The coolant flows from the coolant inlets 120, 121, 122, 123 respectively into the communication passages 106, 107, 108, 109, and part of this coolant passes between the injector holes 18 and the ignition plug holes 16 into the low-pressure spaces, as shown in FIG. 4, due to pressure differences between the high-pressure spaces and the low-pressure spaces with the combustion chambers 4 interposed therebetween. Such coolant flows are generated, to thereby efficiently cool the top parts of the combustion chambers 4 including the injectors. In addition, the coolant does not flow in the longitudinal direction between the combustion chambers 4, but flows in the lateral direction through the low-pressure spaces (coolant spaces 101, 103) located alternately with the high-pressure spaces (coolant spaces 100, 102, 104); therefore, it is possible to reduce the pressure loss through the entire water jacket 6B to a lower level, compared with the so-called longitudinal flow structure.

Embodiment 4

Figure 5:
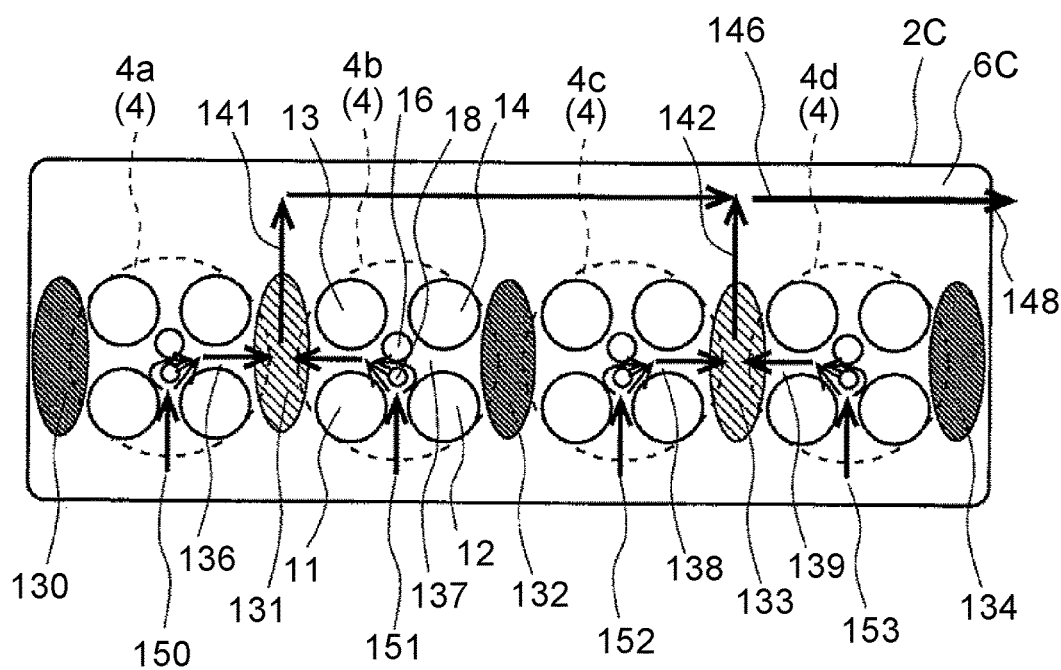
FIG. 5 is a schematic plan view showing a configuration of a water jacket of a cylinder head and coolant flows in the inside of the water jacket of Embodiment 4 of the present disclosure.

Next, Embodiment 4 of the present disclosure will be described with reference to the drawings. FIG. 5 is a schematic plan view showing a configuration of a water jacket of a cylinder head of Embodiment 4 and coolant flows inside of the water jacket. A cylinder head 2C of Embodiment 4 has the same basic configuration as that of the cylinder head 2 of Embodiment 1. Hence, the description regarding the basic configuration of the cylinder head 2 of the Embodiment 1 is directly cited for describing the basic configuration of the cylinder head 2C of Embodiment 4, and duplicated description thereof will be omitted. In FIG. 5, the same reference numerals are used for components common to those of Embodiment 1.

The cylinder head 2C of Embodiment 4 is formed with a water jacket 6C. The water jacket 6C includes: coolant spaces 131, 132, 133 provided respectively between the combustion chambers 4a and 4b, between the combustion chambers 4b and 4c, and between the combustion chambers 4c and 4d; and coolant spaces 130, 134 respectively provided outward of the combustion chambers 4a and 4d at the both ends in the longitudinal direction. The water jacket 6C also includes communication passages 136, 137, 138, 139, each allowing the coolant spaces located on the both sides of each of the combustion chambers 4 to communicate with each other. Each of the communication passages 136, 137, 138, 139 includes: a passage passing between the intake valve holes 11, 12 and the exhaust valve holes 13, 14, and also between the injector hole 18 and the ignition plug hole 16; a passage passing between the intake valve holes 11, 12 and the injector hole 18; and a passage passing through the exhaust valve holes 13, 14 and the ignition plug hole 16.

Coolant inlets 150, 151, 152, 153 provided on the intake side of the respective combustion chambers 4a, 4b, 4c, 4d in the lateral direction of the cylinder head 2C are connected respectively to the communication passages 136, 137, 138, 139. These coolant inlets 150, 151, 152, 153 correspond to the large flow inlets of Embodiment 1. Coolant inlets corresponding to the medium flow inlets and the small flow inlets are also provided, but these inlets have only small influences on the coolant flows, and thus description thereof will be omitted.

The water jacket 6C includes a longitudinal passage 146 that is provided on the exhaust side outward of the combustion chambers 4 and is connected to a coolant outlet 148. The longitudinal passage 146 cools not-illustrated exhaust ports. In addition, the water jacket 6C includes a lateral passage 141 passing through the coolant space 131 and connected to the longitudinal passage 146, and a lateral passage 142 passing through the coolant space 133 and connected to the longitudinal passage 146. These lateral passages 141, 142 are examples of the first lateral passages defined in the claims.

By providing the coolant passages and the coolant inlets and outlet in the above manner, high-pressure spaces having relatively high pressures and low-pressure spaces having relatively low pressures are formed when the coolant flows through the inside of the water jacket 6C. Specifically, the coolant spaces 131, 133 through which the lateral passages 141, 142 pass become the low-pressure spaces, and the coolant spaces 130, 132, 134 where no passages connecting these coolant spaces to the longitudinal passage 146 in the lateral direction pass become the high-pressure spaces.

The coolant flows from the coolant inlets 150, 151, 152, 153 respectively into the communication passages 136, 137, 138, 139, and part of this coolant pass between the injector holes 18 and the ignition plug holes 16 into the low-pressure spaces, as shown in FIG. 5, due to pressure differences between the high-pressure spaces and the low-pressure spaces located with the combustion chambers 4 interposed therebetween. Such coolant flows are generated, to thereby efficiently cool the top parts of the combustion chambers 4 including the injectors. In addition, the coolant does not flow in the longitudinal direction between the combustion chambers 4, but flows in the lateral direction through the low-pressure spaces (coolant spaces 131, 133) located alternately with the high-pressure spaces (coolant spaces 130, 132, 134); therefore, it is possible to reduce the pressure loss through the entire water jacket 6C to a lower level, compared with the so-called longitudinal flow structure.

Other Embodiments

In each of the aforementioned embodiments, the coolant spaces on the front end side in the longitudinal direction of the cylinder head are the high-pressure spaces, but these coolant spaces may be the low-pressure spaces as far as the high-pressure spaces and the low-pressure spaces are alternately arranged with each other with the combustion chambers interposed therebetween.

In each of the aforementioned embodiments, the water jacket may be configured such that the intake side and the exhaust side may be inverted with respect to each other. That is, the coolant outlet and the longitudinal passage connected to the coolant outlet may be disposed on the intake side as viewed from the combustion chambers. In addition, the position of the coolant outlet is not limited to the rear end portion of the cylinder head. The position of the coolant outlet may be at the front end portion of the cylinder head, may be at the side portion thereof, or may be at the cylinder-block mating surface thereof. The coolant outlet may be provided at multiple positions.

The cylinder head according to each of the aforementioned embodiments is a cylinder head for an in-line four cylinder engine, but the present disclosure is applicable to any cylinder head as far as the cylinder head is for an engine having two or more cylinders. The cylinder head according to each of the above embodiments includes the ignition plug holes, but the present disclosure is also applicable to a diesel engine having no ignition plugs. The cylinder head according to each of the above embodiments includes the injector at the center of each combustion chamber, but the present disclosure is applicable to a direct injection engine of side-injection type including an injector near a cylinder wall surface on the intake side, and is also applicable to an engine of port injection type including injectors at intake ports.

What is claimed is:

1. A cylinder head for an internal combustion engine, comprising:
   multiple combustion chambers aligned in a longitudinal direction of the cylinder head;
   each intake valve hole extending through the cylinder head in a vertical direction and opening to the combustion chamber;
   each exhaust valve hole extending through the cylinder head in the vertical direction and opening to the combustion chamber; and
   a water jacket formed in the cylinder head, wherein:
   the water jacket includes multiple coolant spaces located between the combustion chambers that are adjacent, and located outward of the combustion chambers located at both ends in the longitudinal direction;
   the multiple coolant spaces include a high-pressure space having relatively high internal pressures when the coolant flows, and a low-pressure space having relatively low internal pressures when the coolant flows;
   the high-pressure space and the low-pressure space are alternately arranged with each other with the combustion chamber interposed therebetween;
   the water jacket includes a first lateral passage passing through the low-pressure space in a lateral direction of the cylinder head, and a communication passage passing between the intake valve hole and the exhaust valve hole and allowing the high-pressure space and the low-pressure space to communicate with each other;
   a coolant outlet is connected to the first lateral passage; and
   a coolant inlet is connected to the communication passage or to the high-pressure space.

2. The cylinder head according to claim 1, further comprising:
   each injector hole extending through the cylinder head in the vertical direction and opening to an intake side of the combustion chamber; and
   each ignition plug hole extending through the cylinder head in the vertical direction and opening to an exhaust side of the combustion chamber, wherein the communication passage passes between the injector hole and the ignition plug hole.

3. The cylinder head according to claim 2, wherein the communication passage passes between the injector hole and the intake valve hole.

4. The cylinder head according to claim 2, wherein the communication passage passes between the ignition plug hole and the exhaust valve hole.

5. The cylinder head according to claim 1, wherein:
the water jacket includes a longitudinal passage located outward of the combustion chambers and extending in the longitudinal direction;
the coolant outlet is provided to the longitudinal passage; and
the first lateral passage is connected to the coolant outlet via the longitudinal passage.

6. The cylinder head according to claim 5, wherein there is provided no passage connecting the high-pressure space to the longitudinal passage in the lateral direction.

7. The cylinder head according to claim 1, wherein the water jacket includes a second lateral passage that passes through the high-pressure space, extend in the lateral direction, is connected to the coolant outlet, and have a greater pressure loss than that of the first lateral passage when the coolant flows.

8. The cylinder head according to claim 7, wherein:
the water jacket includes a longitudinal passage that is located outward of the combustion chambers, and extends in the longitudinal direction;
the coolant outlet is provided to the longitudinal passage; and
the first lateral passage and the second lateral passage are connected to the coolant outlet via the longitudinal passage.

9. The cylinder head according to claim 8, wherein:
the second lateral passage passes through only some high-pressure spaces of the multiple high-pressure spaces; and
there is provided no passage connecting the rest of the multiple high-pressure spaces to the longitudinal passage in the lateral direction.

* * * * *